United States Patent
Kumagai

(10) Patent No.: US 6,754,039 B2
(45) Date of Patent: Jun. 22, 2004

(54) CASSETTE LOADING APPARATUS

(75) Inventor: Kiyoshi Kumagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 09/765,147

(22) Filed: Jan. 17, 2001

(65) Prior Publication Data

US 2001/0012173 A1 Aug. 9, 2001

(30) Foreign Application Priority Data

Jan. 25, 2000 (JP) ........................................ 2000-015498

(51) Int. Cl.$^7$ ............................................. G11B 15/675
(52) U.S. Cl. ....................................................... 360/96.5
(58) Field of Search ................................. 360/96.5, 85

(56) References Cited

U.S. PATENT DOCUMENTS 5,687,041 A * 11/1997 Lee ............................ 360/96.5

* cited by examiner

Primary Examiner—Robert S. Tupper
(74) Attorney, Agent, or Firm—Robin, Blecker & Daley

(57) ABSTRACT

A cassette loading apparatus includes a holder arranged to hold a cassette, and a link mechanism arranged to support the holder with a plurality of levers in such a way as to allow the holder to ascend and descend between an ascended position and a descended position with respect to a chassis. The link mechanism includes a pair of levers which are disposed respectively on two opposite sides of the holder, and the pair of levers are formed integrally with each other through a connection part arranged above an upper part of the cassette.

3 Claims, 20 Drawing Sheets

CASSETTE LOADING APPARATUS

BACKGROUND OF THE INVENTION

1. Field of the Invention

The present invention relates to a cassette loading apparatus arranged to cause a tape cassette containing therein a tape for a VTR (video tape recorder) or the like to ascend and descend, and also relates to a recording or reproducing apparatus, such as a VTR, which is provided with the cassette loading apparatus.

2. Description of Related Art

An example of the conventional arrangement of a cassette loading apparatus mounted in a video camera or the like is described below with reference to FIGS. 1 to 9. FIGS. 1, 2 and 3 are side views showing, by way of example, the arrangement of a conventional cassette loading apparatus. A cassette holder 102 is arranged to hold a tape cassette 101. A cassette pressing spring 103 is provided at the holder 102 for keeping the cassette 101 in place. A connection shaft 104 is mounted on a support part of the holder 102. A synchronizing lever 105 is arranged to swing integrally with the connection shaft 104. A lever 106 is connected to the synchronizing lever 105 at about the center part of the synchronizing lever 105 by a shaft 106c and is arranged to form an X-link in conjunction with the synchronizing lever 105. A lock lever 107 is arranged to lock the holder 102. Reference numeral 108 denotes a subchassis arranged to hold the cassette 101. The subchassis 108 is provided with a lock member 109 which is arranged to mesh with the lock lever 107. Cassette receiving members 110 are arranged to receive the cassette 101. Holder receiving members 111 are arranged to receive the holder 102. A lid opening member 112 is provided for opening lids of the cassette 101. A coiled spring 113 is hung between the lock lever 107 and the lever 106 to constantly urge the holder 102 upward and to urge the lock lever 107 to swing clockwise on a shaft 102b which is provided on the holder 102. A switch 114 is arranged to detect the locked state of the holder 102. A main chassis 115 is arranged to hold the subchassis 108 in such a way as to allow the subchassis 108 to slide. Guide shafts 116 are disposed on the main chassis 115 to support and guide the subchassis 108. A lock lever driving member 117 is also disposed on the main chassis 115. A switch holder 123 is arranged to secure the switch 114 to a side surface of the subchassis 108. A flexible printed circuit board 124 is arranged to provide the switch 114 with wiring.

Further, an X-link mechanism of the cassette loading apparatus which is formed by the above-stated parts is also arranged in the same manner on the opposite side of the tape cassette 101, which is not shown. The connection shaft 104 is provided for synchronizing the two X-link mechanisms formed on the two sides of the cassette 101 by interlocking the synchronizing lever 105 on one side with that of the X-link mechanism on the other side.

Referring to FIGS. 1, 2 and 3, the operation of the cassette loading apparatus is described as follows.

The cassette 101 is inserted into the holder 102 in the direction of an arrow A, as shown in FIG. 1. When the upper part of the holder 102 is pushed down against the upward urging force of the spring 113, the shaft 105a of the synchronizing lever 105 and the shaft 106a of the lever 106 slide respectively along a cam slot 108a of the subchassis 108 and the cam slot 102a of the holder 102 to cause the holder 102 and the cassette 101 to descend.

Then, a pin 107a which is provided on the lock lever 107 moves along a slant surface of the lock member 109. Further, the lid opening member 112, which is provided on the subchassis 108, pushes upward the front lid 101a of the cassette 101, so that the front lid 101a and the back lid 101b of the cassette 101 are made to swing on a shaft 101c. As a result, the lids of the cassette 101 come to open.

When the holder 102 and the cassette 101 reach the descended position of the holder 102, as shown in FIG. 2, the pin 107a of the lock lever 107 overrides a hook part of the lock member 109 to be caused to plunge into the lower part of the lock member 109 by the urging force exerted on the lock lever 107, thereby bringing about a locked state of the lock lever 107 in mesh with the lock member 109. In this instance, the plunging action of the lock lever 107 causes a switch operating part 107b which is provided on the lock lever 107 to push the knob 114a of the detecting switch 114. The detecting switch 114 then turns on to detect that the holder 102 has been locked. Further, the front lid 101a and the back lid 101b of the cassette 101 are kept opened at a predetermined angle defined by the lid opening member 112.

FIG. 4 is a diagram showing the cassette 101 in the state of having its lids opened. In this state, the front lid 101a has swung on the shaft 101c, and the back lid 101b has been moved in association with the front lid 101a to shift to the upper portion of the cassette 101.

When the locked state of the holder 102 is detected by the detecting switch 114, a slide mechanism which has a DC motor (not shown) as a drive source thereof acts to cause the subchassis 108 holding the cassette 101 to slide to the right, as viewed in FIG. 2, to bring the subchassis 108 into a recording or reproducing position (FIG. 3). Then, a tape is pulled out from the cassette 101 by a tape loading mechanism to bring about a recordable or reproducible state.

In this state, the cassette 101 is pushed by the action of the cassette pressing spring 103 (FIG. 1) against the cassette receiving members 110, which define a datum height of the cassette 101 on the subchassis 108. There is thus provided some clearance between the bottom of the holder 102 and that of the cassette 101 to prevent the two from coming into contact with each other.

FIGS. 5, 6 and 7 show the cassette loading apparatus as viewed from the direction of the arrow A in FIG. 1. FIG. 5 is a side view showing the cassette loading apparatus, as viewed from the cassette inserting direction, in a state obtained while the cassette 101 is in process of descending. The cassette 101 descends while being pushed and held on the lower receiving surface of the holder 102 by the action of the cassette pressing spring 103.

FIG. 6 is a sectional view showing the cassette loading apparatus, as viewed from the cassette inserting direction, in a state where the holder 102 has completely descended as shown in FIG. 2 with the holder 102 locked by the intermeshing of the lock lever 107 and the lock member 109. In this instance, in order to make the pin 107a of the lock lever 107 (FIG. 1) plunge into the lock member 109 for intermeshing, it is necessary for the holder 102 to descend excessively from the locked position (overstroke). Hence, the holder 102 is pushed down lower than the height thereof in the locked position (HL in FIG. 6), and is then brought back to the locked position.

FIG. 7 shows the cassette loading apparatus in a state where the holder 102 has descended to the extent of such an overstroke. After the state shown in FIG. 7, the lock lever 107 comes to mesh with the lock member 109. At the same time, the holder 102 is caused to ascend by the action of the spring 113 (FIG. 1) to bring about the state shown in FIG. 6.

When the holder 102 is caused to descend by pushing the holder 102 down toward the locked position or by some other load imposed thereon, the holder receiving members 111 receive the lower surface of the holder 102 to restrict the height of the holder 102. The height of the holder receiving members 111 is set at a height position corresponding to the overstroke necessary for the lock mechanism as mentioned above.

FIGS. 8 and 9 are plan views showing the subchassis 108 as viewed from above and, particularly, more clearly showing the sliding action thereof. In FIGS. 8 and 9, there are illustrated a recording and reproducing drum 118, a capstan 119, reel mounts 120, a cassette memory terminal 121, and tape guides 122.

Further, referring to FIGS. 8 and 9, slide slots 108b are arranged in the subchassis 108 to allow guide shafts 116 to slide there. Reference numeral 101d denotes the tape. As shown in FIGS. 8 and 9, the slide slots 108b are formed along the two ends of the subchassis 108. The subchassis 108 is provided further with an escape hole 108c which is formed in an area where the fore end part of the lock lever 107 acts by piercing therethrough. With the holder 102 in the descended state, the fore end part of the lock lever 107 protrudes from the lower side of the subchassis 108, as shown in FIGS. 2 and 3.

FIG. 8 shows the cassette loading apparatus in such a position as to allow the cassette to be inserted and loaded as shown in FIGS. 1 and 2. When the locked state of the holder 102 is detected, as mentioned above, the subchassis 108 slides upward as viewed in FIG. 8. At the same time, the tape 110d is pulled out from the cassette 101 by the tape guides 122. With the tape 101d pulled out, a predetermined tape path is formed as shown in FIG. 9 to permit recording or reproduction on or from the tape 101d. With the cassette loading apparatus in this state, the capstan 119 causes the tape 110d to travel at a predetermined speed. The reel mounts 120 are in mesh with reel hubs arranged within the cassette 101 in such a way as to take up and wind at a predetermined torque the tape 101d sent out forward by the capstan 119 in a known manner.

In taking out the cassette from the cassette loading apparatus, the conventional arrangement acts as follows. Upon receipt of a command to eject the cassette 101, the subchassis 108 makes an outward slide motion, as shown in FIGS. 2 and 8, reversely to the above-stated inward slide motion. At the same time, the tape 101d is rewound into the cassette 101. After that, the lock lever driving member 117 on the main chassis 115 moves in the direction of an arrow B shown in FIG. 2. This causes the lock lever 107 to swing counterclockwise against the urging force of the spring 113 to cancel the interlocking of the lock lever 107 and the lock member 109. The holder 102 is thus unlocked to be allowed to ascend by the lifting force of the spring 113, then moving to the cassette-taking-out position as shown in FIG. 1.

In the example of the above-mentioned conventional arrangement, however, the levers and the detecting switches, etc., have not been arranged in a manner apposite to a reduction in size of the cassette loading apparatus.

In the first place, since the connection shaft 104 is disposed on the upper part of the holder 102, the mechanism in the upper part of the holder 102 has a large dead space, which makes a reduction in thickness of the cassette loading apparatus difficult.

Further, in order to minimize a space to be occupied by a deck of the cassette loading apparatus, the connection shaft 104 must be disposed as close as possible to the cassette lids to permit the effective use of a space available above the upper surface of the cassette. However, in the case of the example of the conventional cassette loading apparatus, the detecting switch, the switch holder, the flexible printed circuit board for connection, etc., prevent the connection shaft 104 from being disposed close to the cassette lids. In other words, in order to have the X-link mechanism and the cassette detecting switch interposed in between the cassette 101 and the subchassis 108, it is necessary for avoiding interference with levers, etc., to increase a space in the direction of width of the cassette loading apparatus.

Further, in order that the connection shaft 104 is disposed in the neighborhood of the cassette lids, the lock lever 107 must be disposed on the cassette inserting side to avoid interference with the synchronizing lever 105, as in the case of the example of the conventional arrangement. However, as shown in FIG. 8, it becomes necessary to have the hole 108c which has the lock lever 107 piercing therethrough located adjacent to the slide slot 108b of the subchassis 108. This necessitates a distance "d" shown in FIG. 8 to be sufficiently large to ensure a necessary strength and thus also prevents a reduction in size in the direction of width of the cassette loading apparatus.

Further, in the example of the conventional arrangement described above, the lid opening member 112 is disposed on the subchassis 108. Thus, the location of the lid opening member 112 also lowers the degree of latitude allowed for design work and also prevents a reduction in size of the cassette loading apparatus.

The arrangement of the conventional cassette loading apparatus described by way of example above thus makes it difficult to minimize the size of the cassette loading apparatus both in the directions of height and width.

BRIEF SUMMARY OF THE INVENTION

Under such a background, the invention is directed to the solution of the problem of the prior art described in the foregoing. It is, therefore, an object of the invention to provide a cassette loading apparatus arranged to minimize a dead space caused by a mechanism of the upper part of a holder and to permit the effective use of the space of the upper part of the holder for the purpose of reducing the size of the cassette loading apparatus.

Further, it is another object of the invention to optimize the positional arrangement of levers, a lid opening member, a detection switch, etc., which constitute the cassette loading apparatus, for the purpose of reducing the size of the cassette loading apparatus.

To attain the above objects, in accordance with an aspect of the invention, there is provided a cassette loading apparatus, which comprises a holder arranged to hold a cassette, and a link mechanism arranged to support the holder with a plurality of levers in such a way as to allow the holder to ascend and descend between an ascended position and a descended position with respect to a chassis, wherein the link mechanism includes a pair of levers which are disposed respectively on two opposite sides of the holder, the pair of levers being formed integrally with each other through a connection part arranged above an upper part of the cassette.

These and further objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 16:
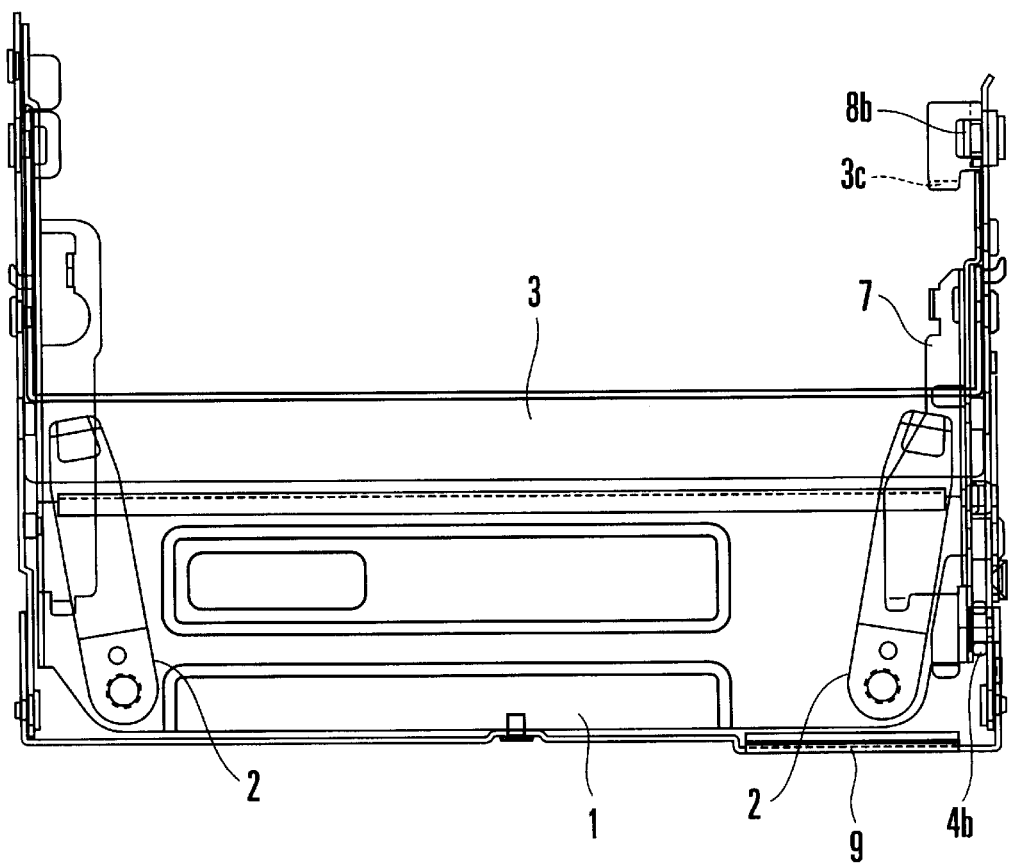
FIG. 16 is a plan view of the cassette loading apparatus according to the embodiment.
Figure 17:
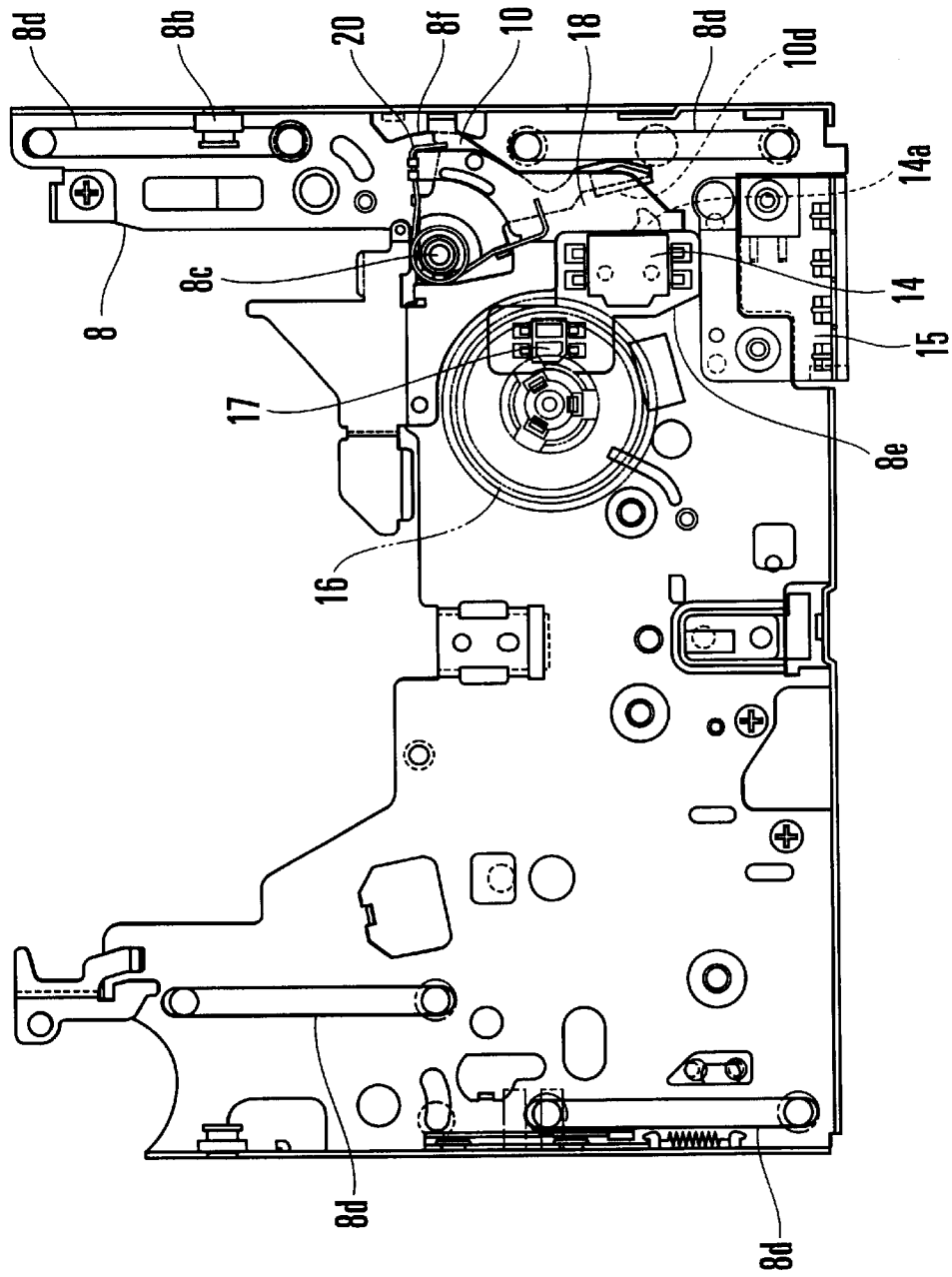
FIG. 17 is a plan view of a slide chassis in the cassette loading apparatus according to the embodiment.

FIGS. 10 to 15 are side views showing a cassette loading apparatus according to an embodiment of the invention. FIGS. 16 and 17 are plan views showing the cassette loading apparatus according to the embodiment.

Referring to FIGS. 10 to 17, a holder 1 is arranged to hold a tape cassette 101, which is inserted from the direction of an arrow A. A cassette pressing spring 2 is arranged to push the (tape) cassette 101. A synchronizing lever 3 is connected with the holder 1 in such a way as to be swingable on a shaft 1b which is provided on the holder 1. A lever 4 is connected to the synchronizing lever 3 at a shaft 3a of the synchronizing lever 3 to form an X-shaped link in conjunction with the synchronizing lever 3. A coiled spring 5 is hooked between a lock lever 6 and the lever 4 to urge the lock lever 6 to move clockwise on a shaft 1c which is provided on the holder 1 and also to constantly urge the holder 1 upward.

A subholder 7 is mounted on the inner side of the holder 1 in such a way as to be slidable up and down. A slide chassis 8 is provided with a shaft 8c. A back plate 9 is connected to the slide chassis 8 and is provided with a shaft 4a on which the lever 4 is swingable. An eject lever 10 is mounted on the shaft 8c of the slide chassis 8 and is swingable on the shaft 8c. Reference numeral 11 denotes a main chassis. A driving lever 12 is provided on the main chassis 11.

Figure 1:
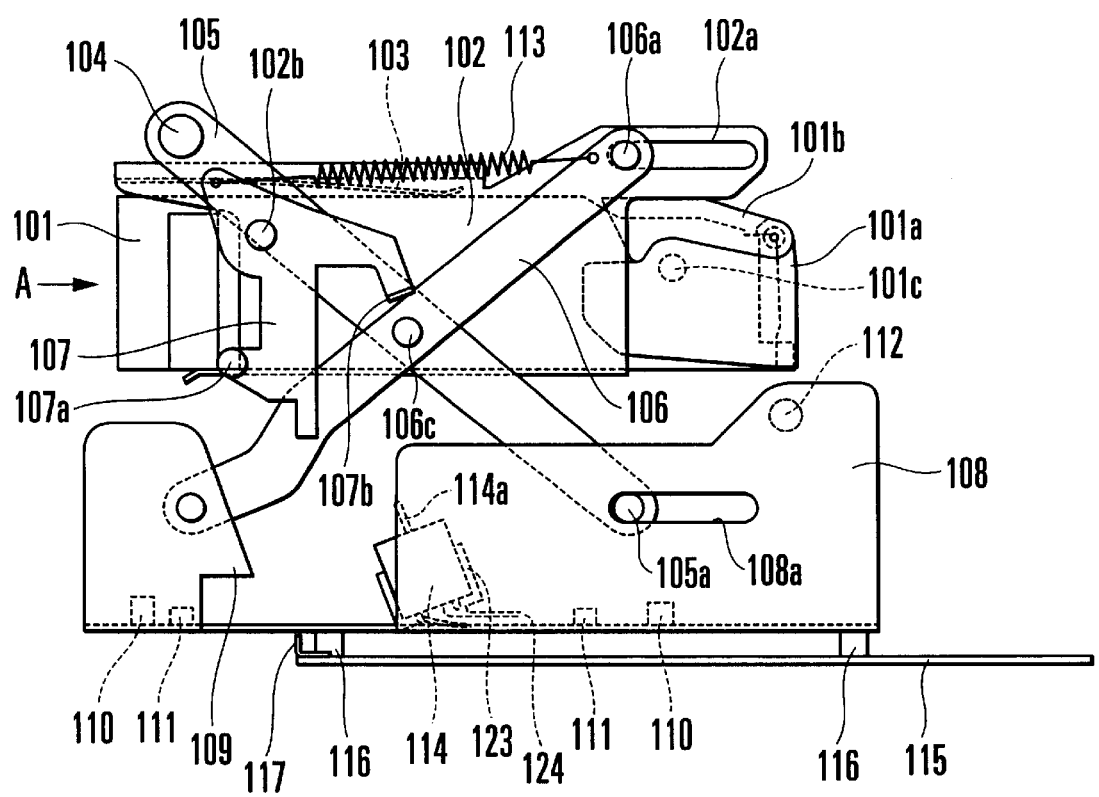
FIG. 1 is a side view showing, by way of example, the arrangement of a conventional cassette loading apparatus in a popped-up state.
Figure 2:
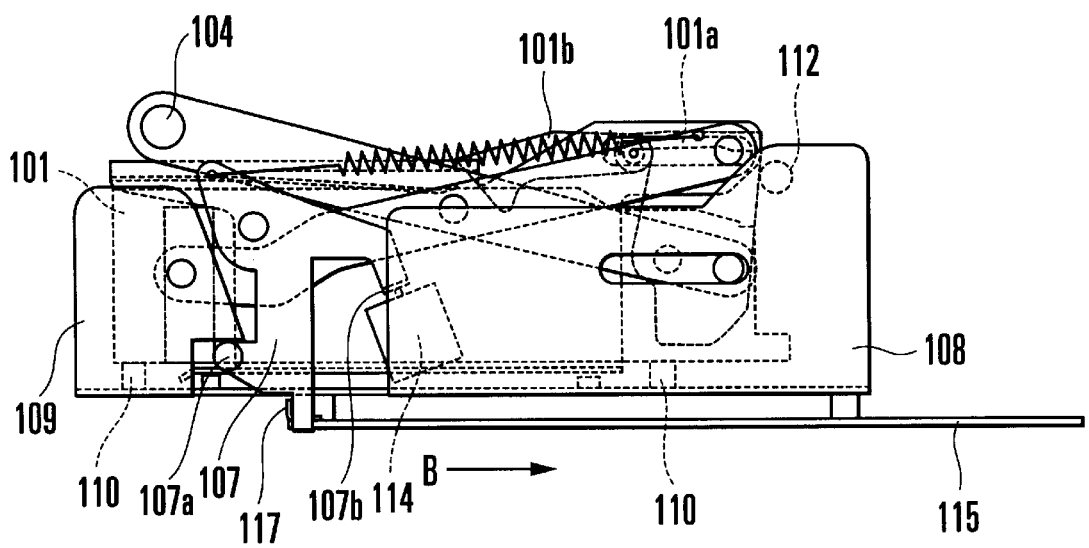
FIG. 2 is a side view showing the conventional cassette loading apparatus in a locked state.
Figure 3:
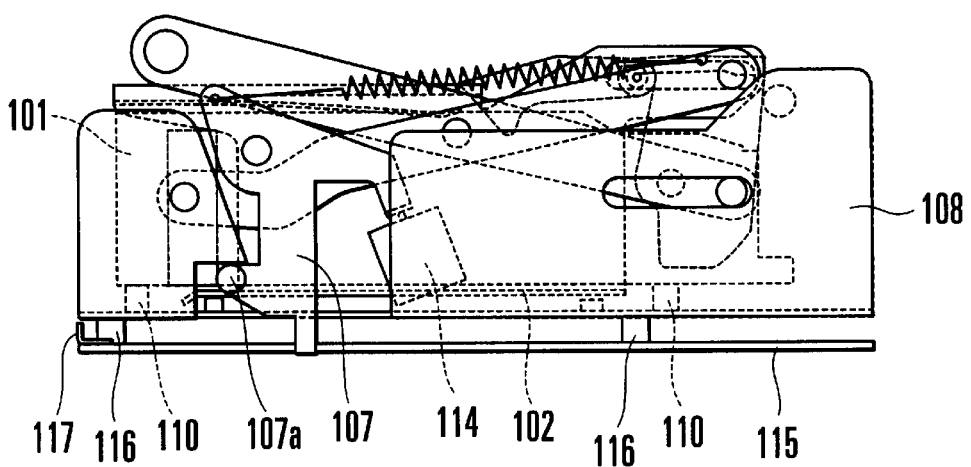
FIG. 3 is a side view showing the conventional cassette loading apparatus in a recording or reproducing state.
Figure 4:
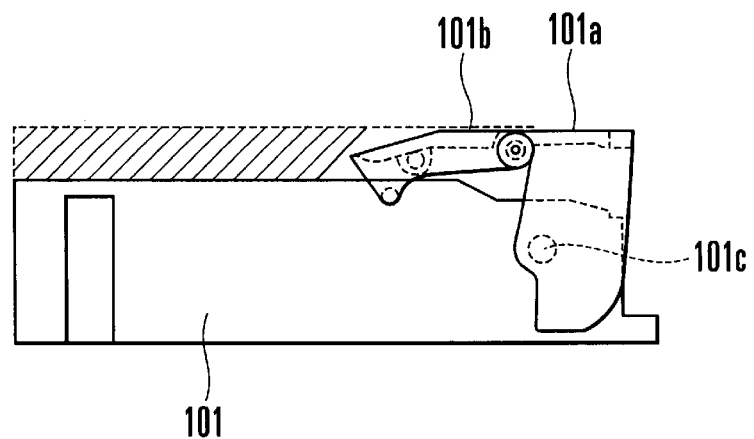
FIG. 4 is a diagram showing a cassette with lids thereof opened.
Figure 5:
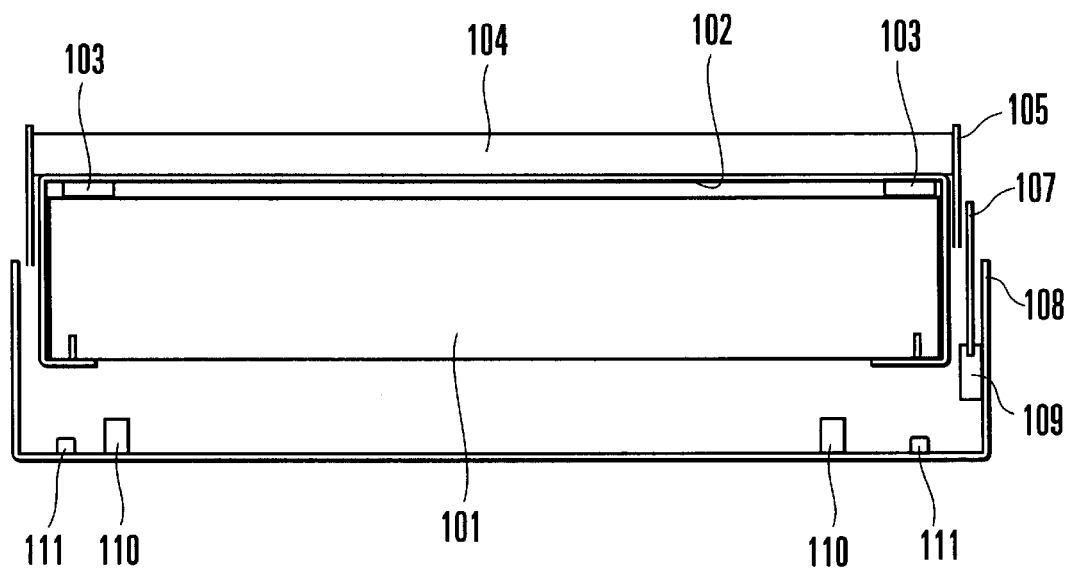
FIG. 5 is a side view showing the conventional cassette loading apparatus, as viewed from the cassette inserting direction, in a state in which the cassette is in process of descending.
Figure 6:
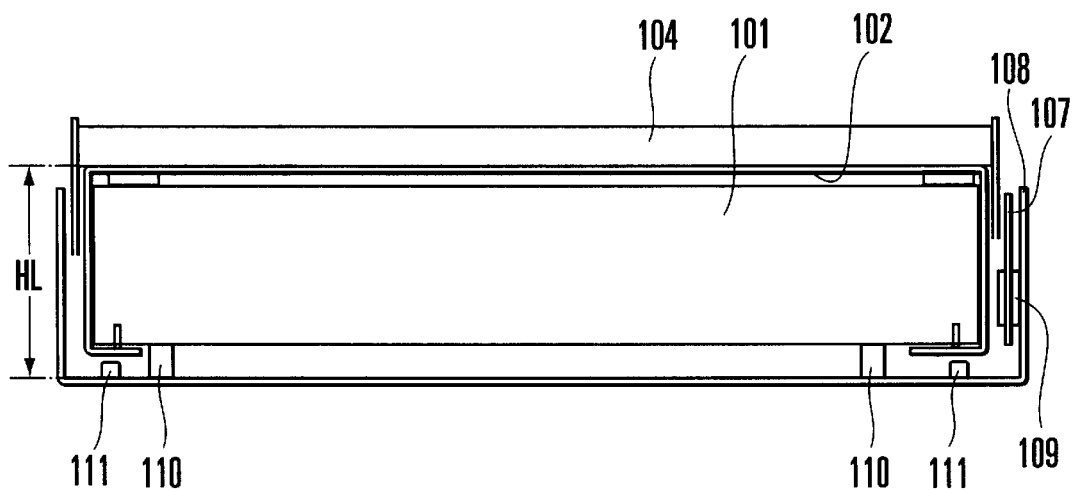
FIG. 6 is a side view showing the conventional cassette loading apparatus, as viewed from the cassette inserting direction, in the locked state.
Figure 7:
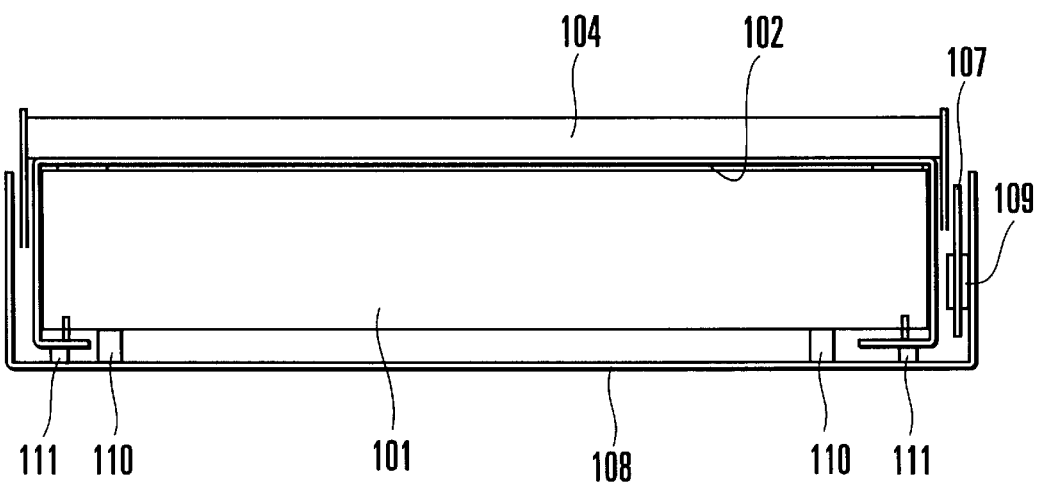
FIG. 7 is a side view showing the conventional cassette loading apparatus, as viewed from the cassette inserting direction, in a state in which a cassette holder has descended to the extent of overstroke.
Figure 8:
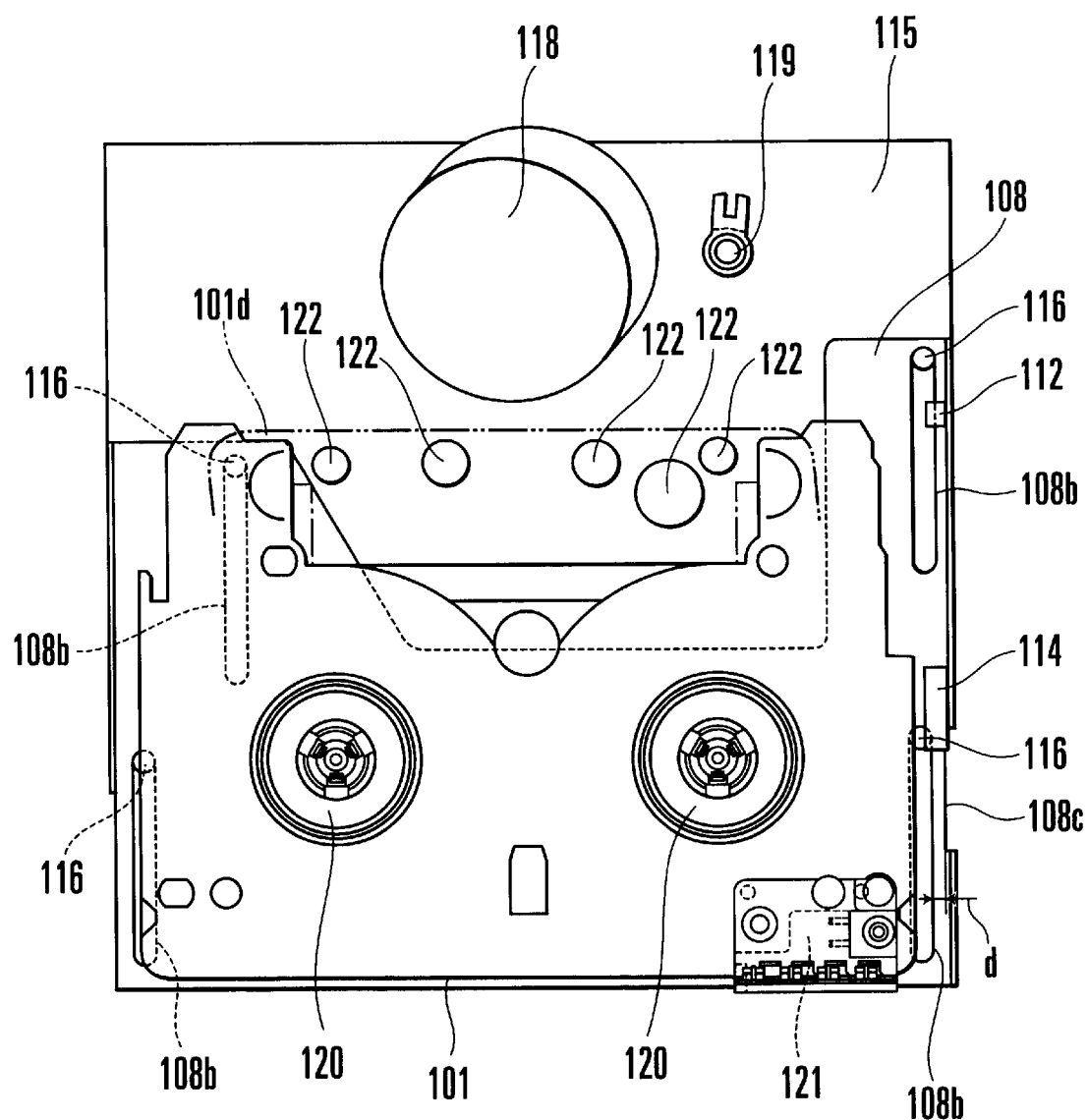
FIG. 8 is a plan view showing a slide chassis (subchassis) in the conventional cassette loading apparatus.
Figure 9:
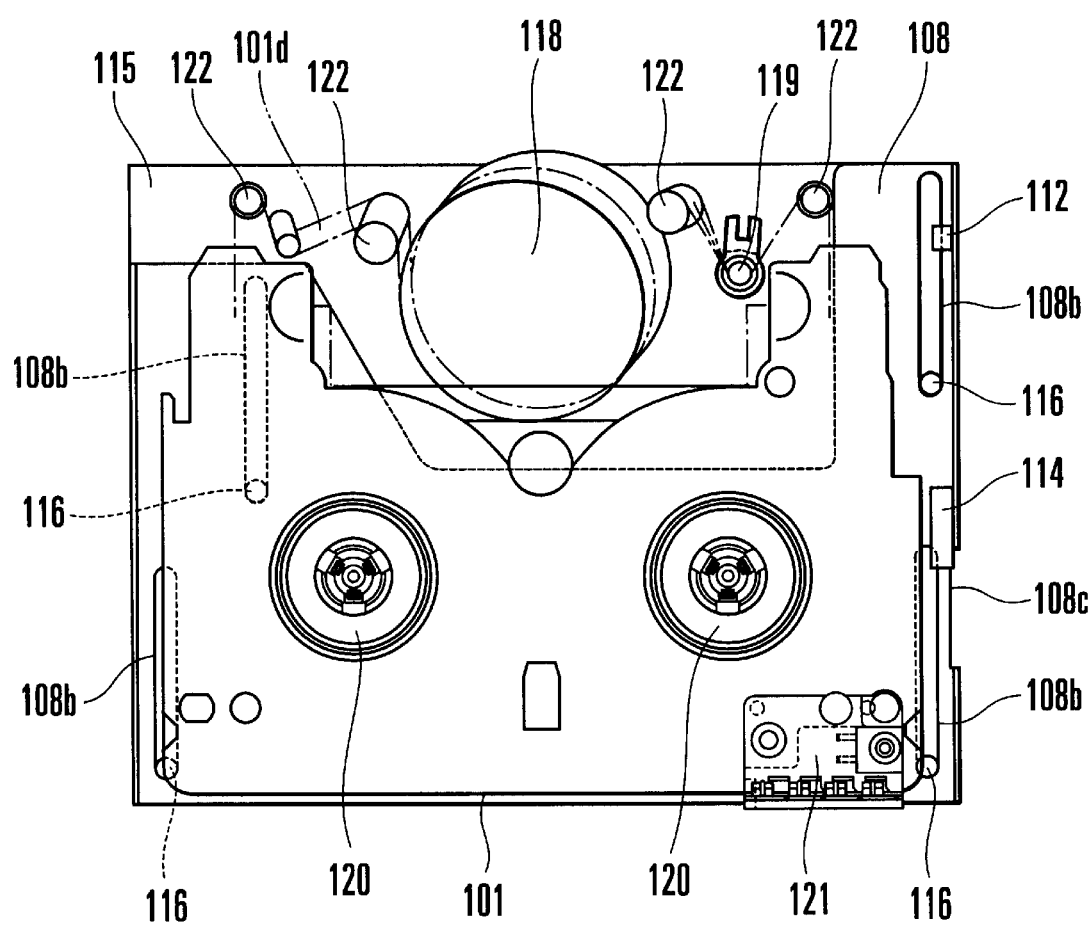
FIG. 9 is a plan view showing the slide chassis (subchassis) in the conventional cassette loading apparatus.
Figure 10:
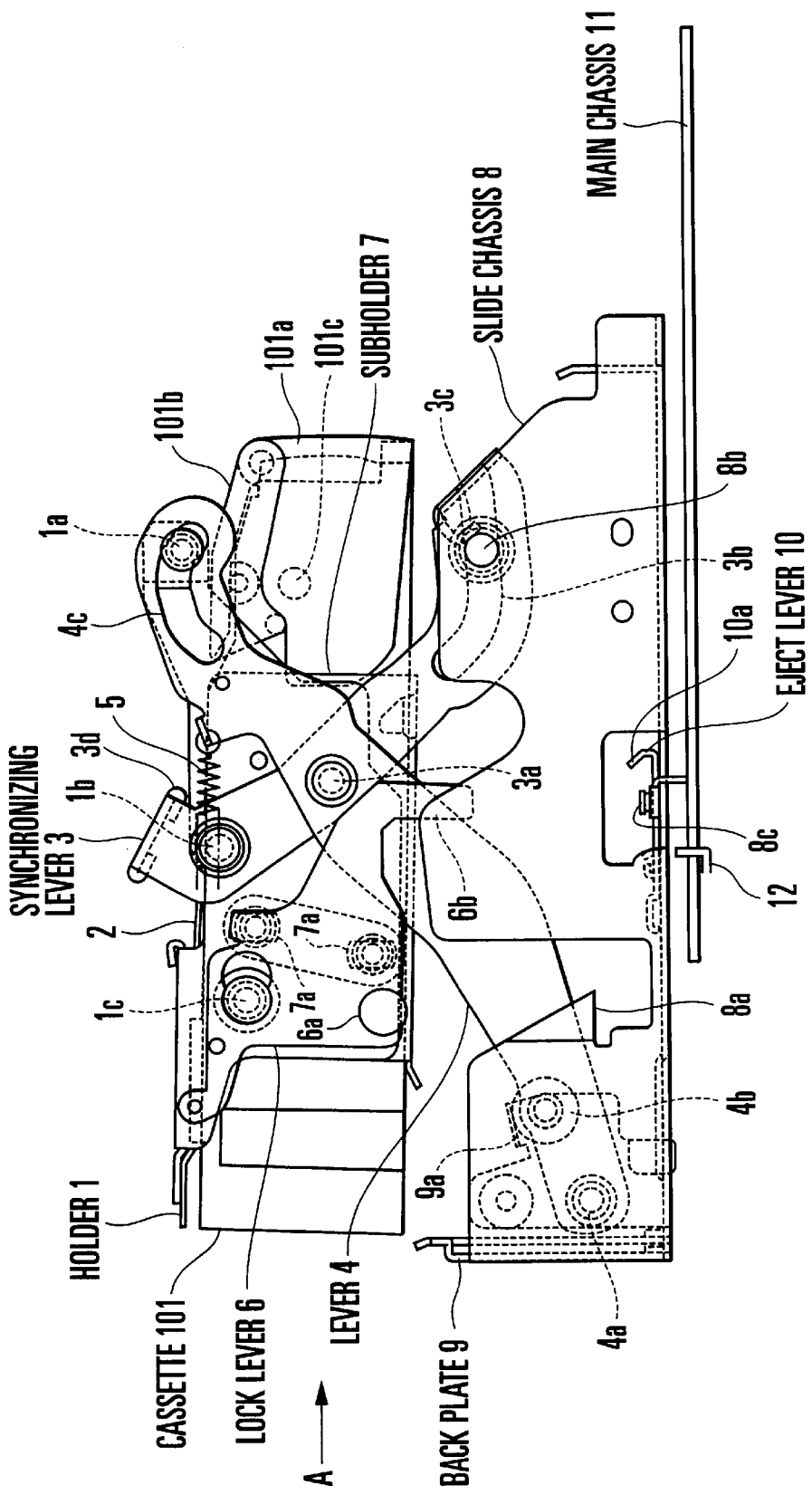
FIG. 10 is a side view showing the arrangement of a cassette loading apparatus, according to an embodiment of the invention, in a popped-up state.
Figure 11:
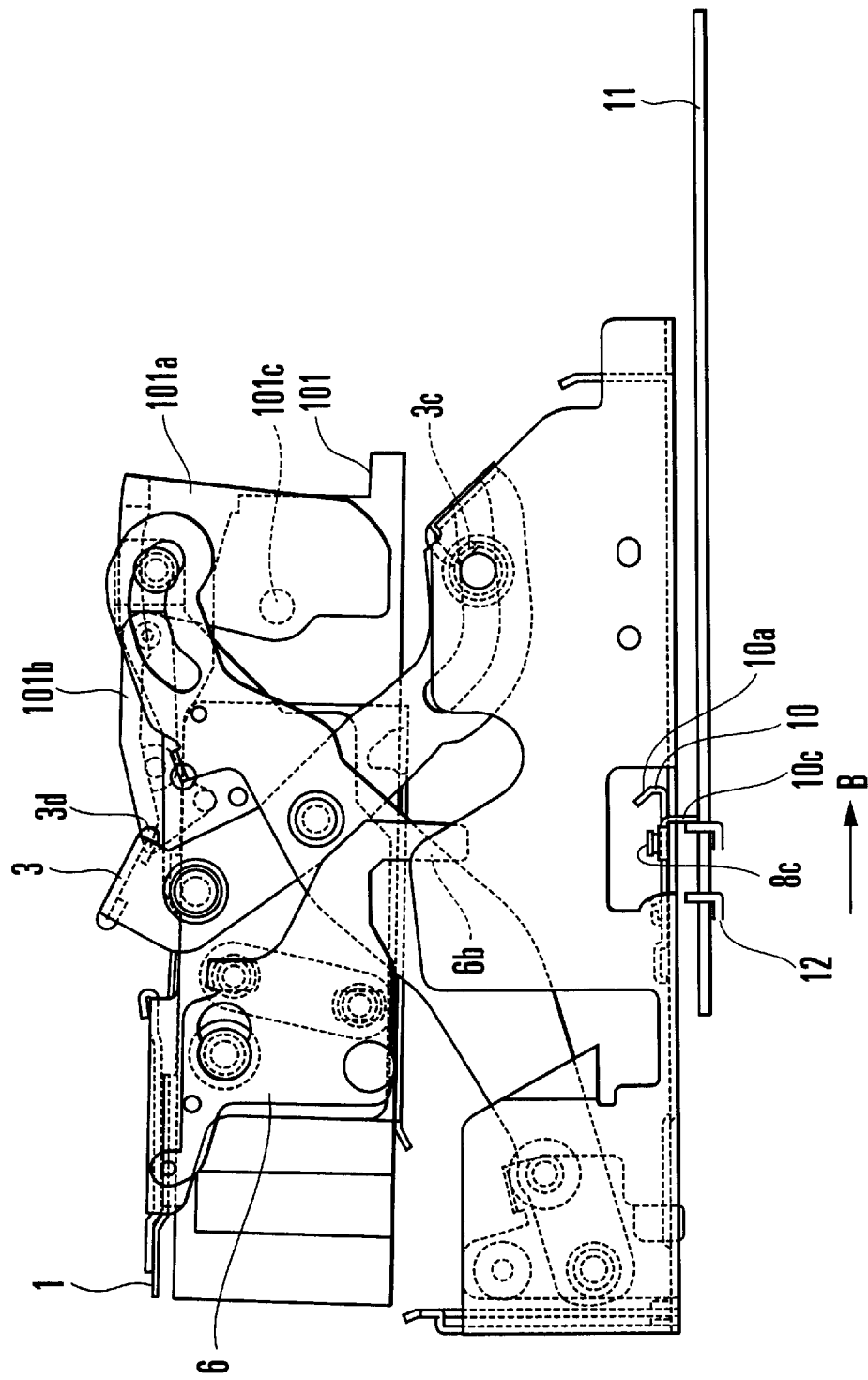
FIG. 11 is a side view showing a positional relation of a synchronizing lever to cassette lids in the popped-up state of the cassette loading apparatus according to the embodiment.

FIG. 10 is a side view showing the cassette loading apparatus in a pop-up state, in which the cassette 101 can be inserted. FIG. 11 is a side view showing the positional relation of the synchronizing lever 3 to the lids of the cassette 101, in the pop-up state. In FIG. 11 the lids of the cassette are shown as they would be if opened when the apparatus is in the pop-up state. As shown in FIG. 11, a connection part 3d of the synchronizing lever 3 is arranged to intrude into a space in which the lids of the cassette 101 would be if opened (a space indicated by hatching in FIG. 4), when the cassette loading apparatus is in the pop-up state (FIG. 10).

Figure 12:
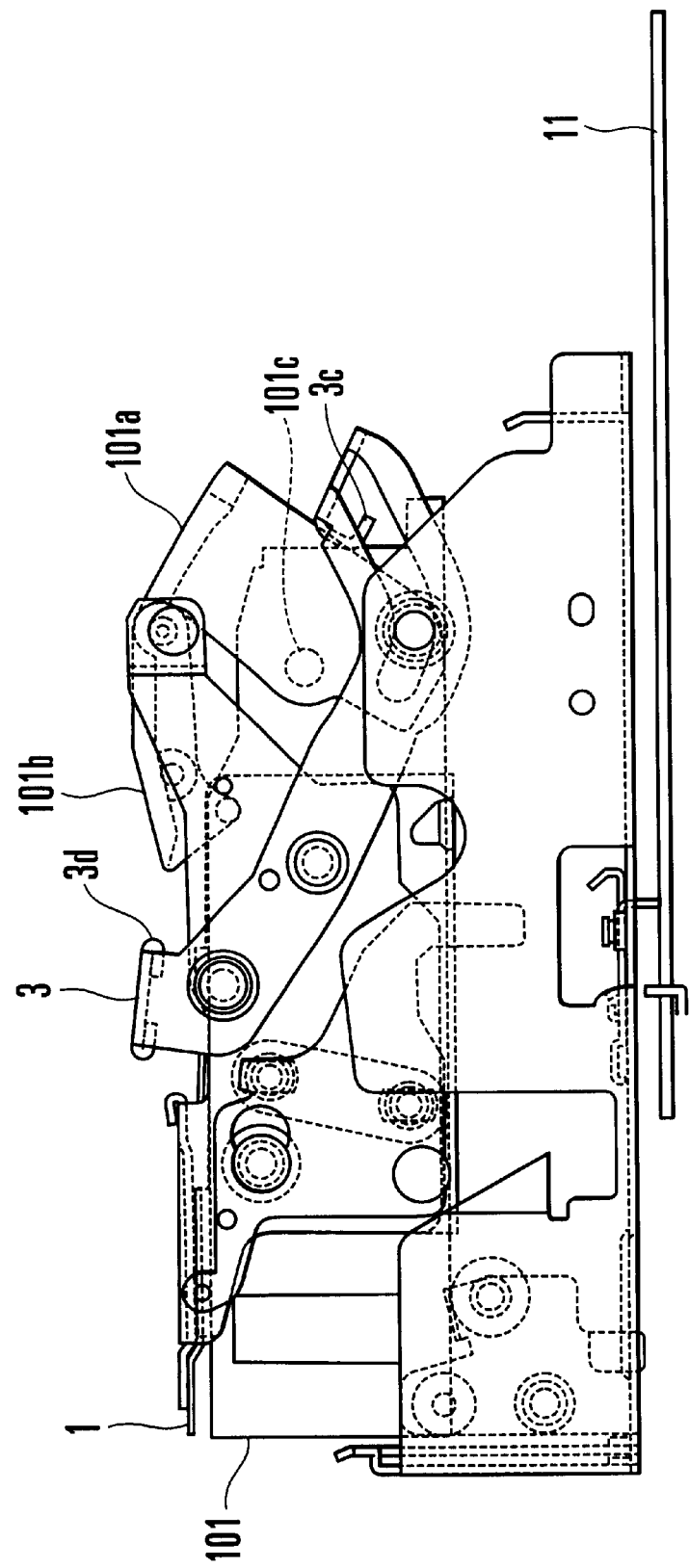
FIG. 12 is a side view showing the cassette loading apparatus, according to the embodiment, in a state in which the cassette is in process of descending.
Figure 13:
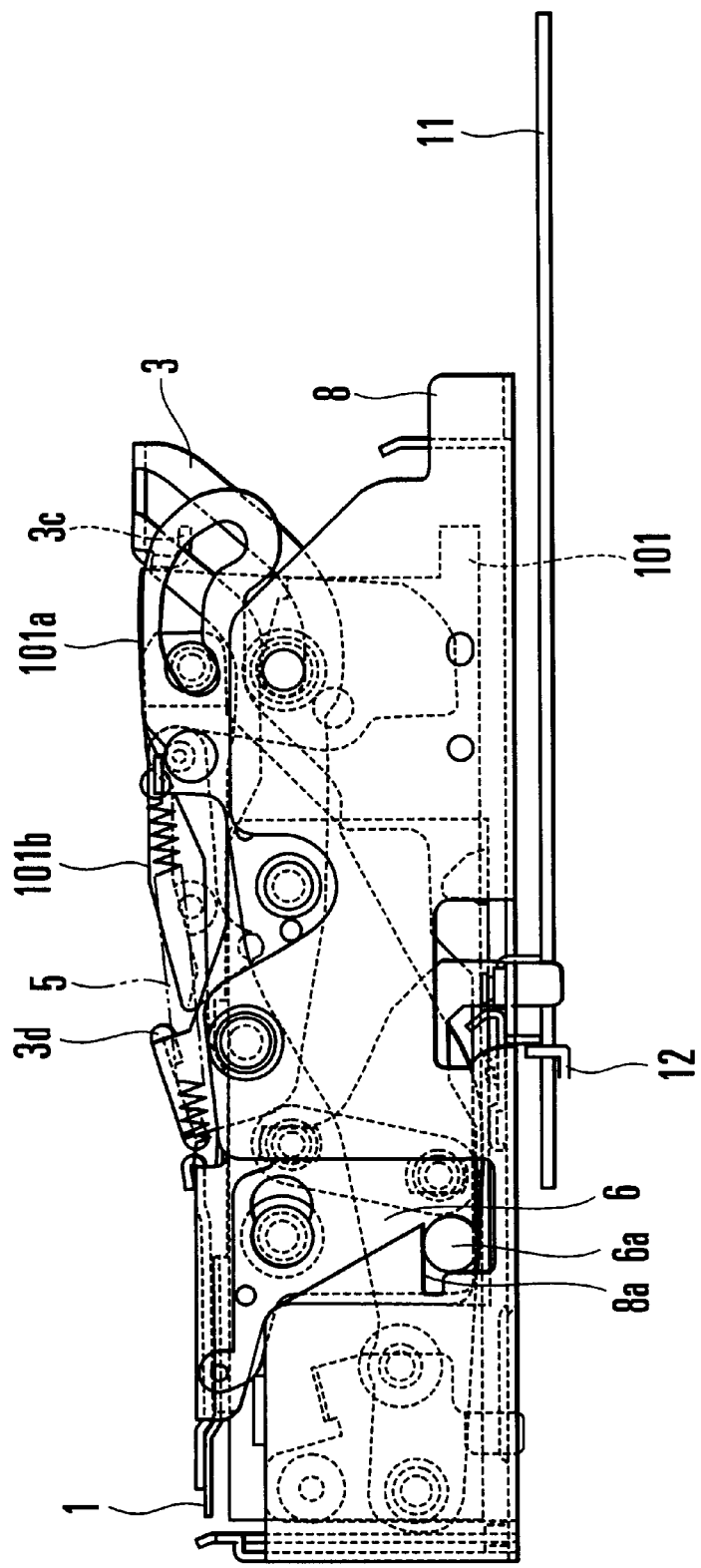
FIG. 13 is a side view showing the cassette loading apparatus, according to the embodiment, in a state in which the cassette has been moved down and locked.
Figure 14:
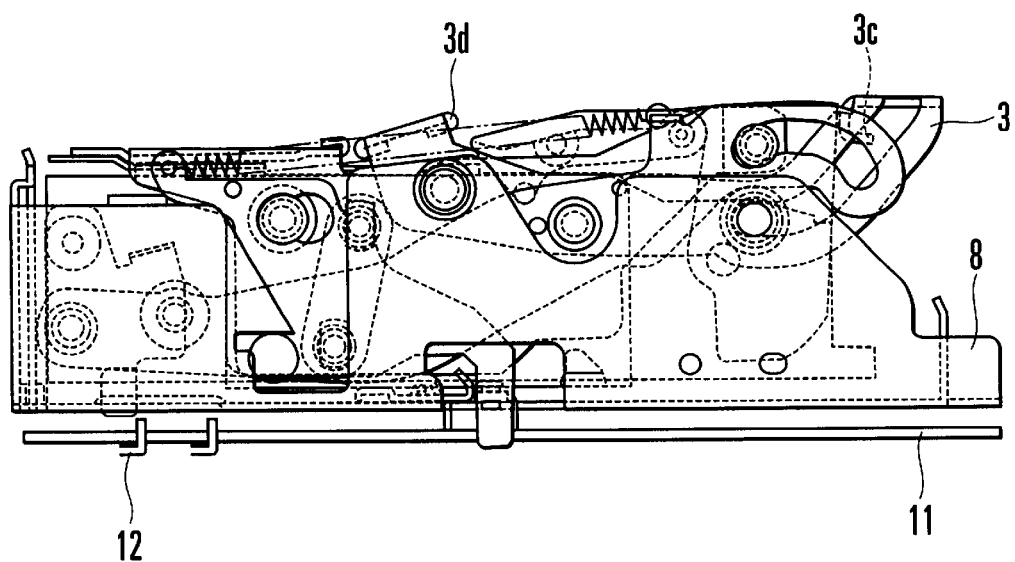
FIG. 14 is a side view showing the cassette loading apparatus, according to the embodiment, in a recording or reproducing state.

FIG. 12 shows in a side view a state of the lids of the cassette 101 obtained while the cassette 101 is in process of descending from the pop-up state. FIG. 13 shows the holder 1 in a locked state. FIG. 14 shows the slide chassis 8 at a recording or reproducing position which is arrived at by sliding the slide chassis 8 relative to the main chassis 11.

Figure 15:
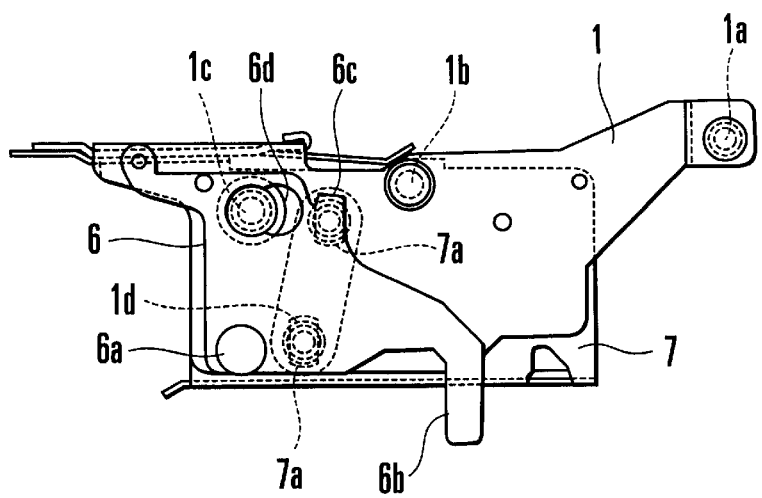
FIG. 15 is a side view showing the arrangement of a holder, a subholder and a lock lever in the cassette loading apparatus according to the embodiment.

FIG. 15 shows in a side view the arrangement of the holder 1, the subholder 7 and the lock lever 6. The subholder 7 is mounted to the holder 1 in such a way as to be slidable up and down through shafts 7a along slots 1d provided in a side wall of the holder 1. The lock lever 6 is mounted on the shaft 1c of the holder 1 by sliding the shaft 1c over a key hole 6d. With the spring 5 (FIG. 10) hooked between the lock lever 6 and the lever 4, the lock lever 6 is urged to swing clockwise on the shaft 1c. At this time, the subholder 7 is biased downward under the urging force of the spring 5 relative to the holder 1 with a stopper 6c, which is provided on the lock lever 6, abutting on the shaft 7a of the subholder 7.

FIG. 16 shows in a plan view the cassette loading apparatus according to the embodiment. The synchronizing lever 3 is composed of right and left lever parts and the connection part 3d and is a pressed part which is integrally formed by press work into such a U shape as to encompass the cassette 101 on its two sides. The connection part 3d of the synchronizing lever 3 which is formed in this manner is disposed near to the middle part of the upper part of the cassette 101. The back plate 9 is a pressed part arranged to connect, in a swingable manner, the shaft 4a (FIG. 10) of the lever 4 which is on one side and that of another lever which is similarly arranged on the other of two opposite sides of the cassette 101.

FIG. 17 shows in a plan view the slide chassis 8 (FIG. 10). The link mechanism which is composed of the holder 1 and the synchronizing lever 3, etc., as mentioned above is mounted as follows. The shaft 8b of the slide chassis 8 is first inserted into a cam slot 3b formed in the fore end engaging part 3c (FIG. 16) of the synchronizing lever 3. After that, the link mechanism is mounted on the inner sides of the right and left bent parts of the slide chassis 8 by securing the above-stated back plate 9 (FIG. 10) to the slide chassis 8 with screws.

Figure 18:
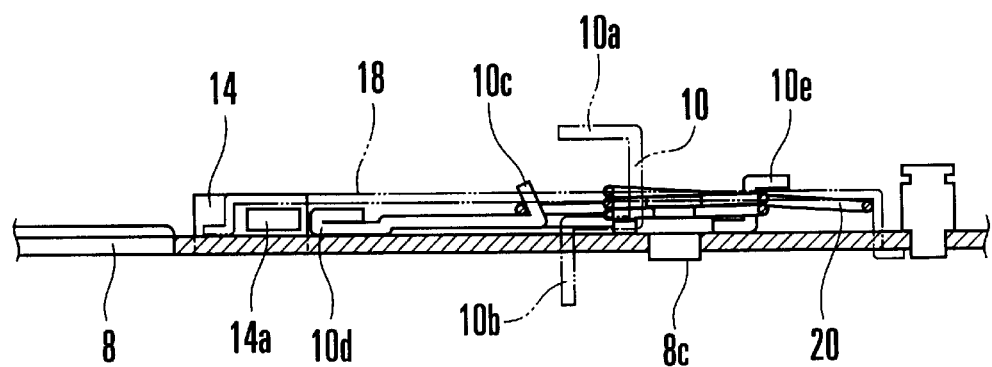
FIG. 18 is a side view showing an eject lever and parts arranged around the eject lever in the cassette loading apparatus according to the embodiment.
Figure 19:
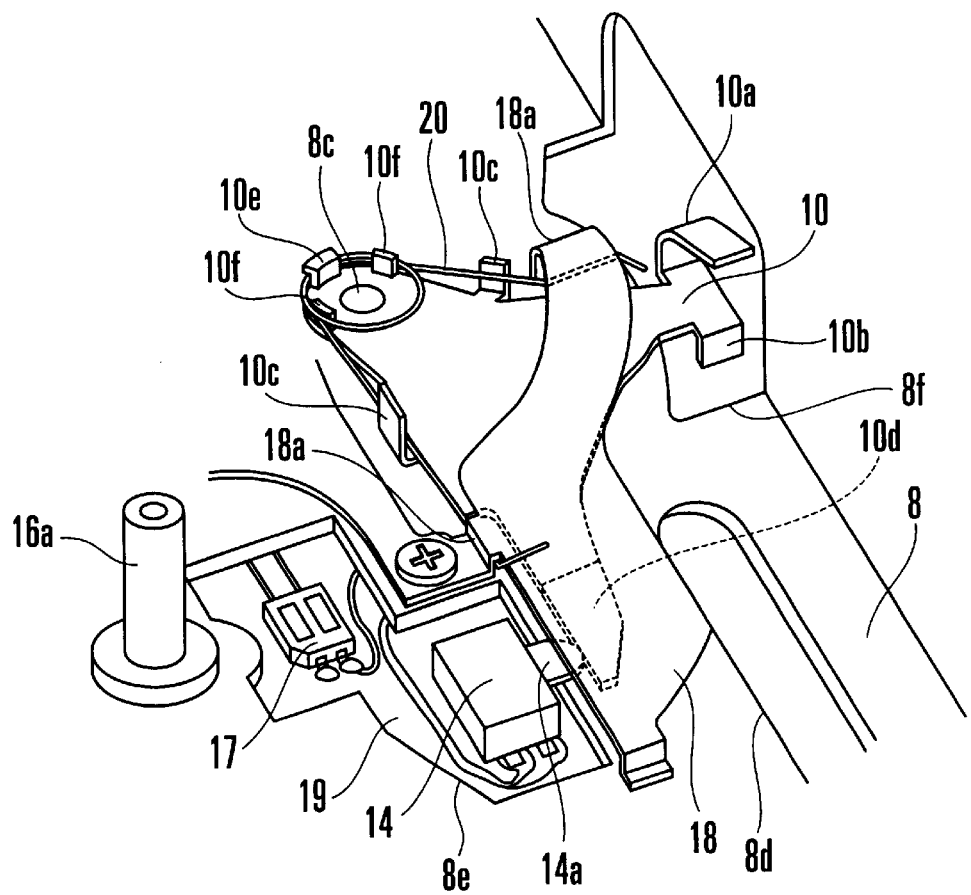
FIG. 19 is a perspective view showing the eject lever and parts arranged around the eject lever in the cassette loading apparatus according to the embodiment.
Figure 20:
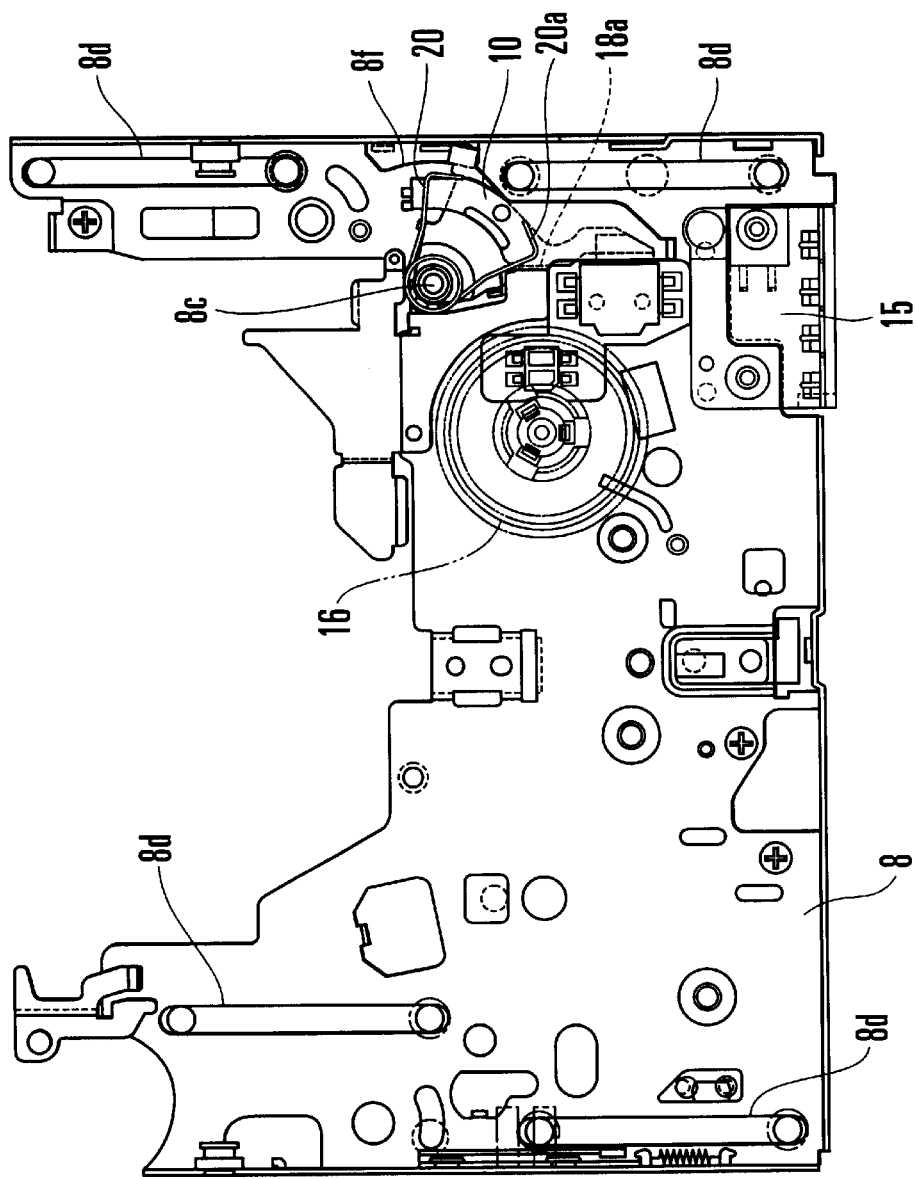
FIG. 20 is a plan view of the slide chassis in the cassette loading apparatus according to the embodiment.
Figure 21:
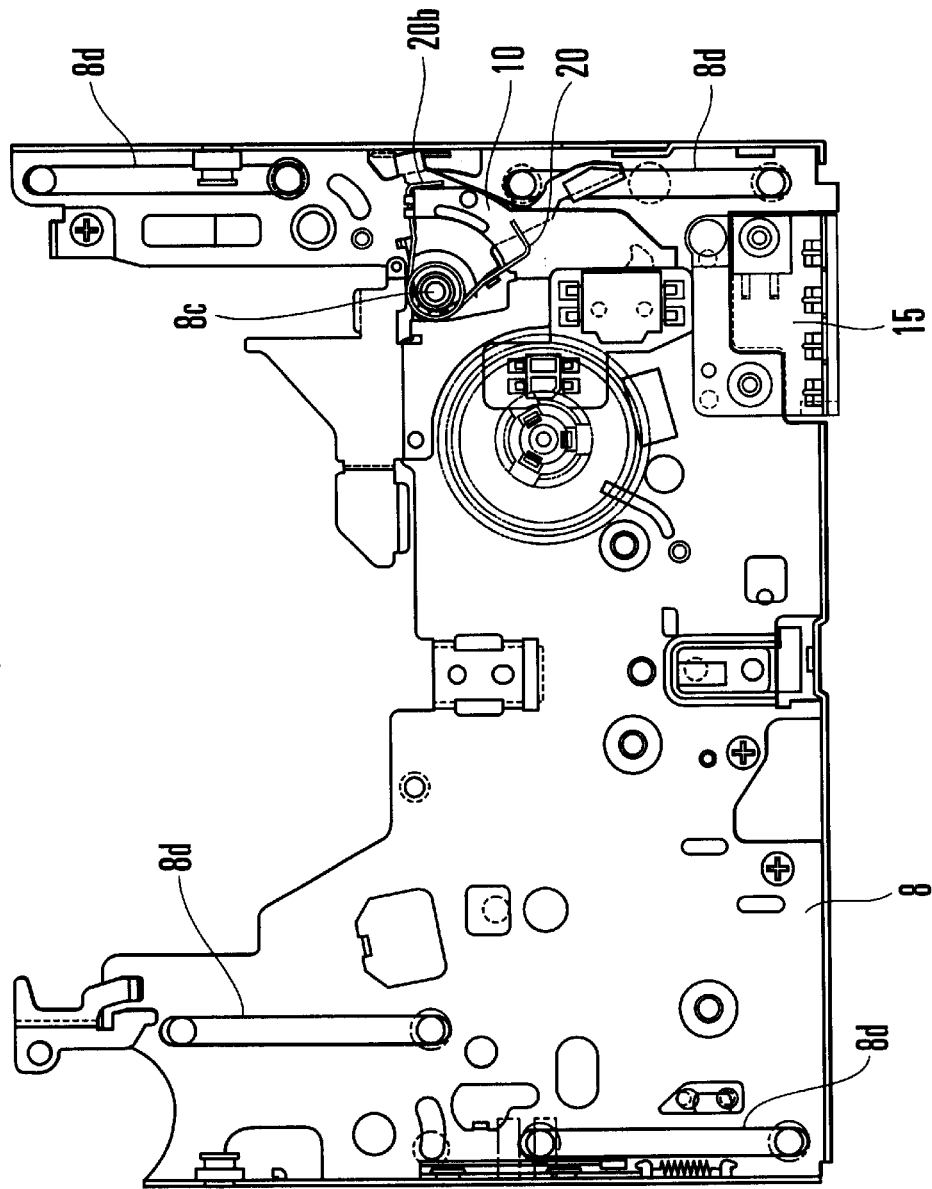
FIG. 21 is a plan view of the slide chassis in the cassette loading apparatus according to the embodiment.
Figure 22:
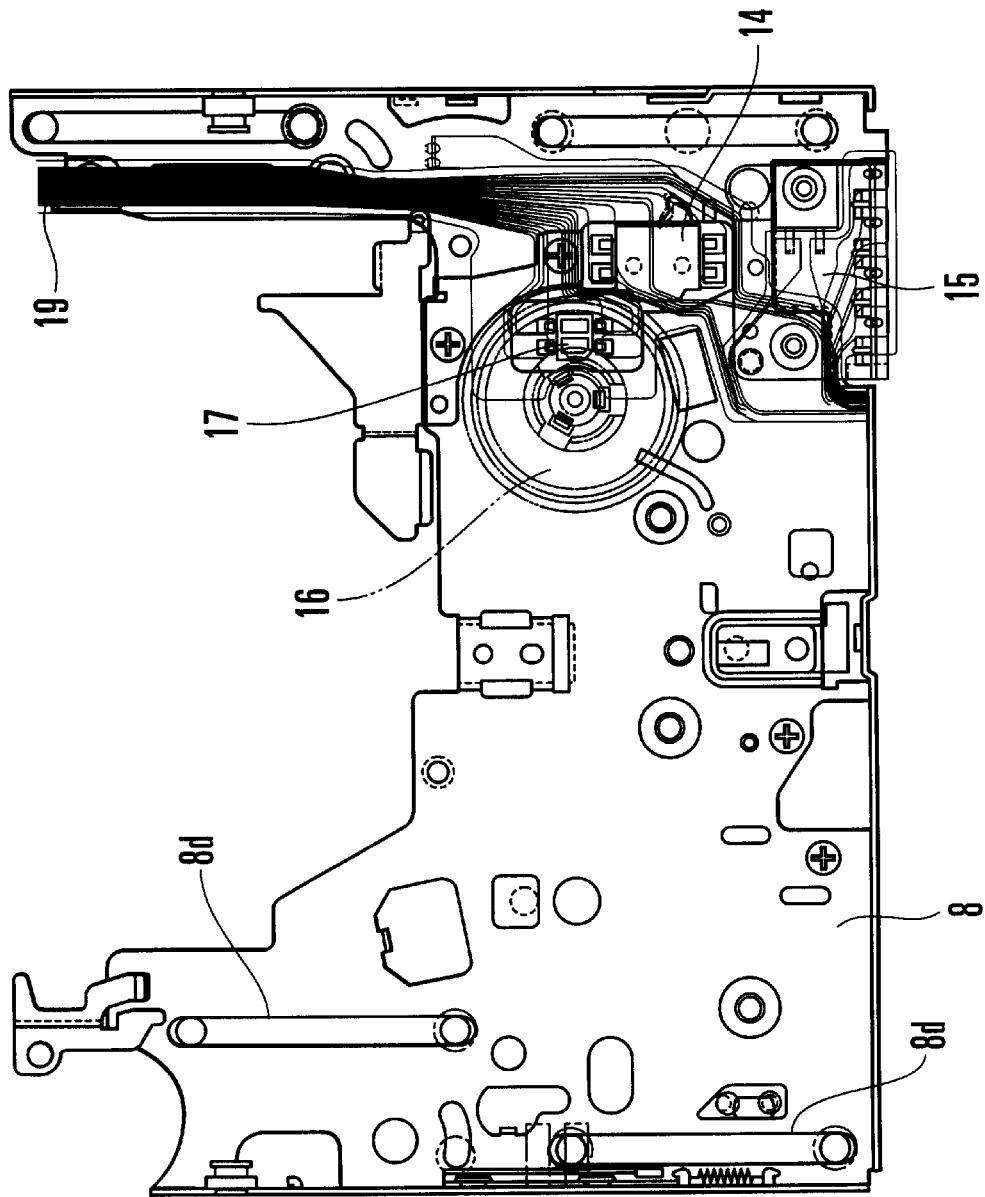
FIG. 22 is a plan view of the slide chassis in the cassette loading apparatus according to the embodiment.

A cassette-in detecting mechanism according to the embodiment is next described below with reference to FIGS. 17 to 22. In FIGS. 17 to 22, there are illustrated a cassette-in (insertion) detecting switch 14 disposed on the slide chassis 8, a cassette memory terminal 15, a reel mount 16, a reel sensor 17, a keep plate 18, a flexible printed circuit board 19, and a return spring 20 which is mounted on the eject lever 10. FIG. 17 shows in a plan view the slide chassis 8 in a state in which the holder 1 is in the ascended position (hereinafter referred to as the ST-BY state). FIG. 18 shows in a side view the arrangement of parts around the eject lever 10. FIG. 19 shows in a perspective view the parts around the eject lever 10. FIG. 20 shows in a plan view the slide chassis 8 in a state in which the holder 1 has been locked by the lock lever 6 (hereinafter referred to as the locked state). FIG. 21 shows in a plan view the slide chassis 8 in a state in which the holder 1 is released from the locked state (hereinafter referred to as the ejecting state) according to a command for ejection.

Referring to FIGS. 17 to 22, the eject lever 10 is supported by the shaft 8c on the slide chassis 8 to be swingable on the shaft 8c. The keep plate 18, which is made of a thin plate, is disposed over the eject lever 10. Further, the return spring 20 is hooked on bent-up parts 10e and 10f provided in the neighborhood of the center of swing of the eject lever 10 and is thus arranged integrally with the eject lever 10. The return spring 20 has arms fitted on two bent-up parts 10c of the eject lever 10 in a charging state. The fore end parts of the arms of the return spring 20 are also attached to two bent-up parts 18a of the keep plate 18 in a charging state. With the return spring 20 arranged in this manner, the eject lever 10 is constantly urged to return to a neutral position as shown in FIG. 17.

In the locked state which is obtained with the eject lever 10 having swung clockwise, as shown in FIG. 20, an arm 20a of the return spring 20 performs a charging action in conjunction with the bent-up part 18a of the keep plate 18 to generate a counterclockwise moment. In the ejecting state which is obtained with the eject lever 10 having swung counterclockwise, as shown in FIG. 21, another arm 20b of the return spring 20 performs a charging action in conjunction with the bent-up part 18a of the keep plate 18 to generate a clockwise moment.

The eject lever 10 has a driven part 10b, which protrudes from the lower part of the slide chassis 8 through a hole part 8f of the slide chassis 8. However, since the hole part 8f is formed in such a position as not to be adjacent to the slide slot 8d of the slide chassis 8, the hole part 8f causes no problem in respect of strength.

Figure 23:
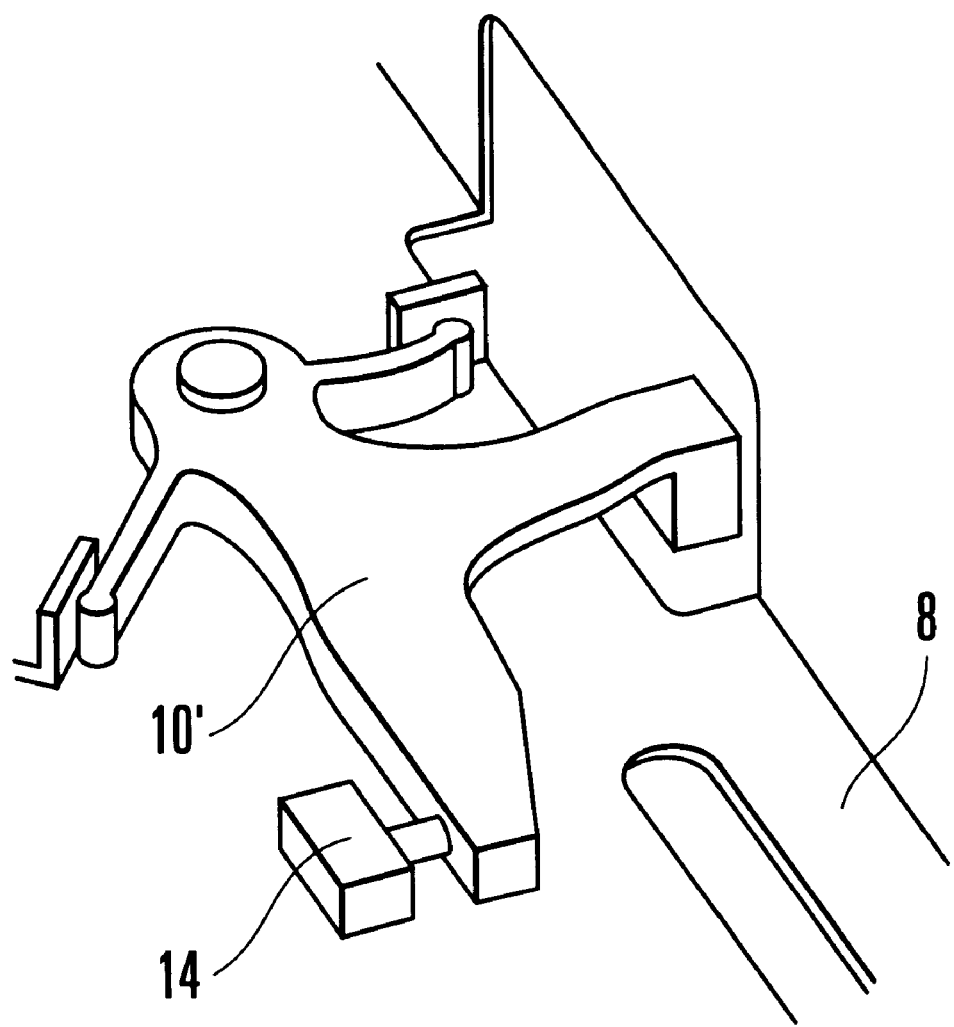
FIG. 23 is a perspective view showing, by way of example, a modification of the eject lever in the cassette loading apparatus according to the embodiment.

Further, if the cassette loading apparatus affords a sufficiently wide margin for thickness, the eject lever 10 may be molded with a plastic material, as an eject lever 10' shown in FIG. 23, in such a way as to exert an urging force by utilizing the resilience of the plastic material.

The cassette-in detecting switch 14 is mounted on an upper surface of the flexible printed circuit board 19 which is attached to the back side of the slide chassis 8 and is exposed through a hole part 8e provided in the slide chassis 8. A space left in the direction of thickness of the cassette loading apparatus is effectively minimized with the switch 14 mounted in this manner. On the flexible printed circuit board 19, there are also mounted the reel sensor 17, which detects the rotation of the reel mount 16, and the cassette memory terminal 15. However, since the parts mounted on the circuit board 19 are arranged in a congregative manner, the area of the flexible printed circuit board 19 can be arranged to be in a small and simple shape.

The above-stated detecting switch 14 has a knob 14a. The knob 14a is arranged to be guided through a space between the keep plate 18 and the slide chassis 8 with a predetermined clearance. Meanwhile, the eject lever 10 has a switch operating part 10d, which is formed by bending back and folding a metal plate to have a sufficient thickness and to enable the eject lever 10 to reliably perform a pushing action on the switch 14 although the eject lever 10 is thinly formed.

The cassette loading apparatus according to the embodiment of the invention operates as described below. A cassette loading operation is first described as follows.

As shown in FIG. 10, the cassette 101 is inserted from the direction of the arrow A. The holder 1 is pushed down against its ascending force to cause the holder 1 to descend with the cam slot 3b of the synchronizing lever 3 and the shaft 8b of the slide chassis 8 sliding on each other while the cam slot 4c of the lever 4 and the shaft 1a of the holder 1 also slide on each other.

In the pop-up state shown in FIG. 10, since the connection part 3d of the synchronizing lever 3 is aslant toward the cassette inserting direction in this state, the connection part 3d guides the upper part of the cassette 101 without locking the cassette 101 when the upper part of the cassette 101 comes to abut on the connection part 3d. The connection part 3d of the synchronizing lever 3 thus functions as a guide member in inserting the cassette 101 to a correct position.

Referring to FIG. 12, while the cassette 101 is in process of descending, the front lid 110a of the cassette 101 is lifted up by the fore end engaging part 3c of the synchronizing lever 3 which is arranged to be caused to swing counterclockwise accordingly as the holder 1 moves down. The front lid 110a of the cassette 101 then swings on the center of swing 101c. At the same time, the back lid 101b of the cassette 101 moves to the upper part of the cassette 101. Both the front and back lids 110a and 101b of the cassette 101 thus come to open. At this time, the connection part 3d of the synchronizing lever 3 is caused to move in the same direction as the back lid 101b (a direction opposite to the direction of the arrow A shown in FIG. 10) by the counterclockwise swing of the synchronizing lever 3.

When the holder 1 and the cassette 101 reach the descended position of the holder 1 (FIG. 13), the pin 6a of the lock lever 6 comes beyond (overrides) an angular part of the guide member 8a to be caused by the lock lever urging force to plunge into and intermesh with the lower part of the guide member 8a to bring about a locked state. At the same time as the interlocking, the fore end part 6b of the lock lever 6 (FIG. 10) comes to push a part 10a of the eject lever 10 to cause the eject lever 10 to swing on the shaft 8c. The swinging force of the lock lever 6 is set to be stronger than the returning force of the eject lever 10. The eject lever 10, therefore, swings from the neutral position shown in FIG. 17 to a lock position shown in FIG. 20. This causes the cassette-in detecting switch 14 to turn on to detect that the holder 1 has been locked.

The front lid 110a and the back lid 101b of the cassette 101 are kept in their prescribed open positions by the fore end engaging part 3c of the synchronizing lever 3, so that the tape can be pulled out from the cassette 101. The front and back lids 101a and 101b of the cassette 101 are thus arranged to be opened by means of the synchronizing lever 3. This arrangement not only permits the simplification of the structural arrangement of the cassette loading apparatus but also enables the holder 1 to be caused to descend at a reliably accurate timing.

Figure 24:
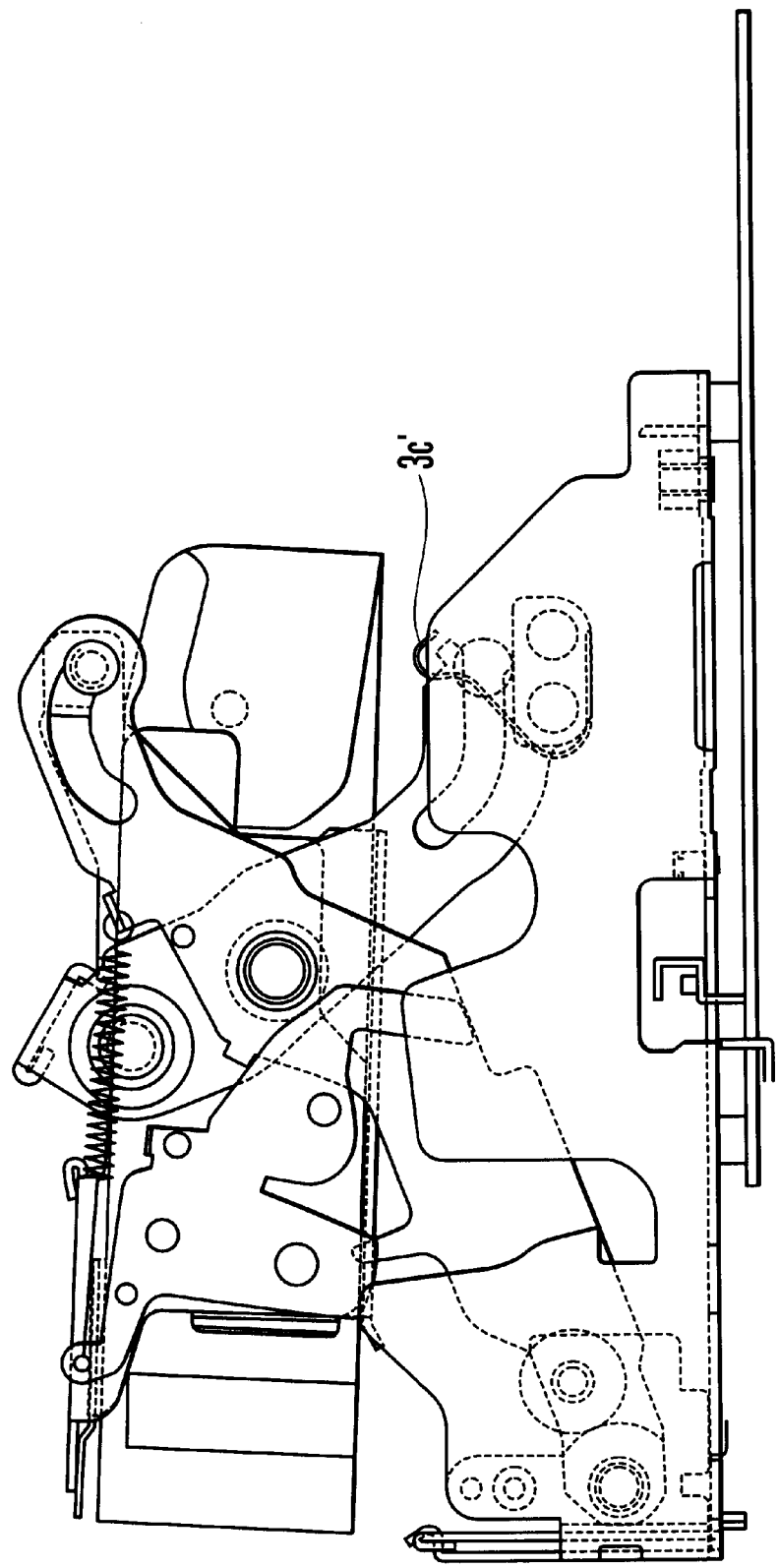
FIG. 24 is a side view showing, by way of example, a modification of an engaging part 3c in the cassette loading apparatus according to the embodiment.

In a possible modification of the embodiment of the invention, the fore end engaging part 3c of the synchronizing lever 3 is replaced with an elastic member 3c' which is arranged as shown in FIG. 24.

Further, with the front and back lids 101a and 101b of the cassette 101 in the above-stated open state, the upper part (connection part 3d) of the synchronizing lever 3 is located along the back lid 101b. The spring 5 is located lower than the height of the back lid 101b (which is open) and the height of the synchronizing lever 3. The cassette loading apparatus is thus arranged to minimize a dead space left above the cassette 101. In accordance with the invention, the connection part 3d and the center of swing of the synchronizing lever 3 are allocated near to the lids of the cassette 101 and the lock lever 6 is allocated close to a cassette inserting entrance part. Therefore, the cassette loading apparatus can be compactly arranged to be in a size close to the size of the tape cassette 101.

Upon detection of the locked state of the holder 1, the slide chassis 8 is caused by a driving mechanism (not shown) to slide over the main chassis 11 along the guide slots 8d shown in FIG. 17. At the same time, the tape is pulled out from the cassette 101 by a tape loading mechanism (not shown). With the tape pulled out, a predetermined tape path is formed in such a way as to have the pulled-out tape wrapped around a recording/reproducing head to permit recording or reproduction to be performed on or from the tape (FIG. 14).

Figure 25:
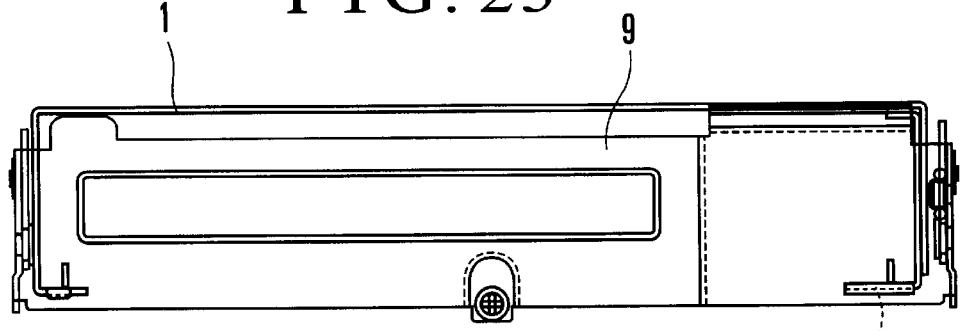
FIG. 25 is a side view showing the cassette loading apparatus, according to the embodiment, as viewed from the cassette inserting direction.
Figure 26A:
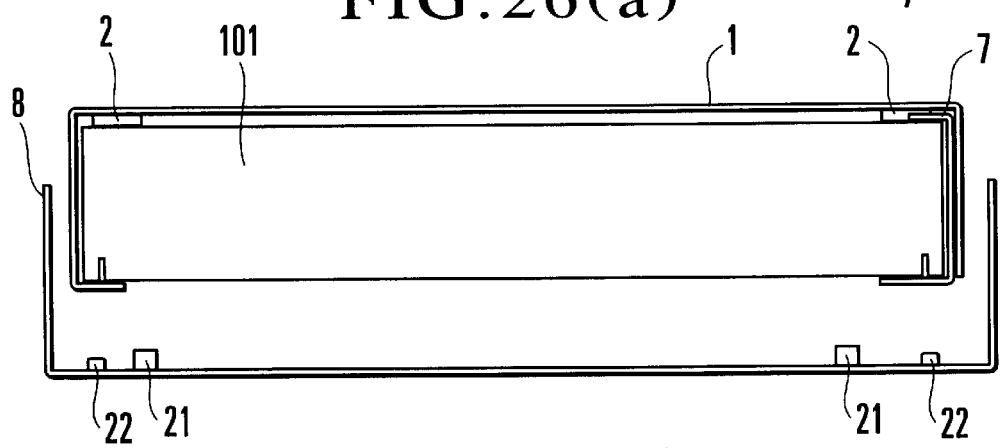
FIGS. 26(a), 26(b) and 26(c) are side views showing the cassette loading apparatus, according to the embodiment, as viewed from the cassette inserting direction.
Figure 26B:
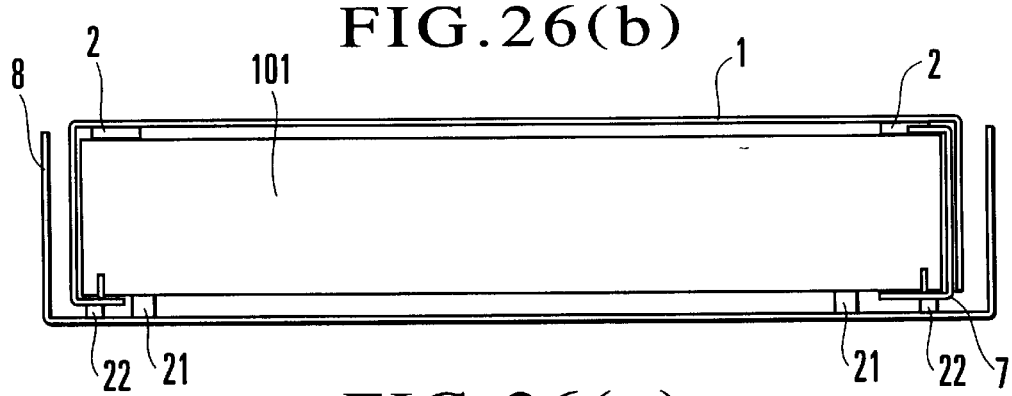
Figure 26C:
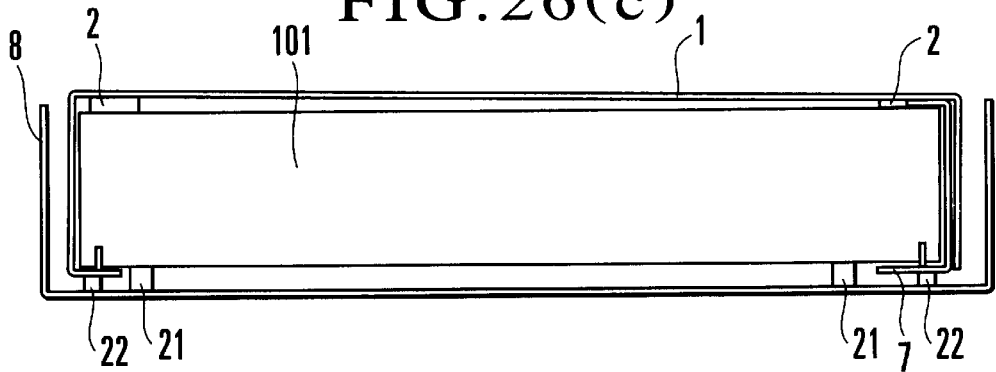

The relation of the holder 1 and the subholder 7 to the tape cassette 101 is next described. FIG. 25 shows the cassette loading apparatus, as viewed from the direction of the arrow A, in a state of having the cassette locked. FIG. 26(*a*) shows the relation of the holder 1 to the cassette 101 in a state obtained while the cassette 101 is moving downward. FIG. 26(*b*) shows the relation of the holder 1 to the cassette 101 in a state obtained while the holder 1 is in the locked state. FIG. 26(*c*) shows the relation of the holder 1 to the cassette 101 in a state obtained while the holder 1 is at the overstroke position.

Referring to FIG. 26(*a*), the cassette 101 descends while being pressed and held by the action of the cassette pressing spring 2 against the receiving surface of the holder 1 and that of the subholder 7. The subholder 7 is biased downward with respect to the holder 1 under the urging force of the lock lever 6 and the force exerted from the cassette 101. The cassette pressing spring 2 is arranged to push the upper surface of the cassette 101, as shown in FIG. 16. The subholder 7 is arranged not to interfere with the cassette pressing spring 2.

In the cassette locking state shown in FIG. 26(*b*), the cassette 101 is pushed against cassette receiving members 21 under the action of the cassette pressing spring 2. Meanwhile, a bottom surface part on the left side of the holder 1 as viewed in FIG. 26(*b*) (on the side having no lock mechanism) abuts on a holder receiving member 22 in such a way as to restrict the height of the bottom surface of the holder 1.

In the overstroke state shown in FIG. 26(*c*), the right side of the holder 1, as viewed in FIG. 26(*c*), having the lock mechanism is alone allowed to move down relative to the subholder 7 for a locking action.

As mentioned in the foregoing, in order to cause the pin 6a of the lock lever 6 to plunge into the guide member 8a, the holder 1 must be allowed to descend further downward (overstroke) from the position obtained after locking. According to the above-stated arrangement of the embodiment, at the time of making the overstroke as shown in FIG. 26(*c*), the cassette receiving surface of the holder 1 and that of the subholder 7 are not allowed to descend, due to the abutment with the holder receiving members 22, while the part of the holder 1 on the locking side is alone allowed to descend further to the extent of an overstroke point. By this arrangement, a dead space in the direction of height of the cassette receiving surfaces of the subholder 7 and the holder 1 and the slide chassis 8 can be lessened.

An ejecting action is next described. When an "eject" command is received, the slide chassis 8 slides in the direction of parting from the main chassis 11. The tape is then wound up into the cassette 101 to bring about a state shown in FIG. 13.

The driving lever 12, which is provided on the main chassis 11, then moves in the direction of an arrow B shown in FIG. 11 to push the part 10c of the eject lever 10. The eject lever 10 is thus caused to swing counterclockwise on the shaft 8c. The part 10a of the eject lever 10 then pushes the fore end part 6b of the lock lever 6. This unlocks the holder 1. The spring 5 then acts to pop up the holder 1 to bring the cassette loading apparatus into the state shown in FIG. 10. At this time, a shock absorbing rubber part 4b which is mounted on the lever 4 abuts on a part 9a of the back plate 9 to absorb the impact of the pop-up action.

The cassette-in detecting switch 14 turns off upon completion of the cassette ejecting action. When the completion of the cassette ejecting action is detected with the switch 14 turned off, the driving lever 12 returns to the stand-by position. Then, the eject lever 10 is brought back to the neutral position shown in FIG. 17 by the action of the return spring 20.

According to the arrangement of the embodiment described above, the use of a connection shaft which has been conventionally used for synchronizing the X-shaped link parts disposed on both sides of the cassette loading apparatus of a magnetic recording and reproducing apparatus is omitted. In the case of the embodiment, a part which corresponds to the conventional connection shaft is formed, by press work, integrally with the lever parts which are disposed on both sides of the cassette loading apparatus, and is arranged in such a way as to stride across the upper part of the cassette. This arrangement effectively minimizes a dead space left above the cassette.

Further, the above-stated pressed part which is integrally formed is arranged to intrude into a space in which the cassette lids are opened, when the cassette loading apparatus is popped up. Then, the pressed part is arranged to escape from the cassette lids when the cassette lids are opened at the same time as the descent of the cassette. That arrangement enables the cassette loading apparatus to have a sufficient strength of the connection part, while the dead space above the upper part of the cassette is minimized, so that an apparatus having the cassette loading apparatus can be compactly arranged.

Further, compared with the conventional cassette loading apparatus described by way of example in the foregoing and arranged to connect the connection shaft to the right and left levers by caulking, the cassette loading apparatus having the pressed part according to the invention can be arranged at a lower cost.

Further, according to the arrangement of the embodiment described above, a mechanism for opening the lids of the cassette is formed by the link mechanism. The arrangement simplifies the structural arrangement, effectively permits a reduction in thickness, and also enables the cassette loading apparatus to perform the lid opening and closing actions at good timing with respect to the ascending and descending action of the holder.

Further, the embodiment described above is arranged to have the cassette-in detecting switch disposed on the slide chassis, to cause the cassette-in detecting switch to act in association with the locking action of the lock lever, and to have the member which is provided for causing the lock lever to perform an unlocking action in association with the ejecting action of the eject lever disposed also on the slide chassis. By virtue of this arrangement, the synchronizing levers can be disposed in the neighborhood of the lids of the tape cassette, and the lock lever can be disposed on the side of the cassette inserting entrance part, where the lock lever does not interfere with the synchronizing levers. This arrangement permits a reduction in size of the cassette loading apparatus to a great extent.

Further, according to the arrangement of the embodiment described, the subholder is arranged on the side of the cassette holder locking mechanism to be movable up and down relative to the cassette holder and to have its position restricted by the holder receiving member on the slide chassis when the holder descends. By virtue of that arrangement, a dead space for an overstroke existing in the direction of height of the cassette holder and the slide chassis can be lessened.

What is claimed is:

1. A cassette loading apparatus, comprising:
    a holder arranged to hold a cassette;
    a link mechanism composed of a plurality of levers and arranged to support said holder in such a way as to allow said holder to ascend and descend with respect to a chassis;
    a cam part, formed on the lever, for controlling the lever to ascend or descend said holder; and
    an engaging part formed in a fore end part of said lever on which said cam part is formed, in such a way as to be capable of engaging a lid of the cassette inserted into said holder and opening the lid of the cassette inserted into said holder, according to a descending action of said holder caused by said cam part.

2. A cassette loading apparatus according to claim 1, wherein the part of said lever in which said engaging part is formed is arranged to swing toward the lid of the cassette according to a descending action of said holder.

3. A cassette loading apparatus according to claim 1, wherein one of said plurality of levers is composed of a pair of lever parts which are disposed respectively on two opposite sides of said holder and a connection part arranged to connect respective end parts of said pair of lever parts with each other, and wherein said engaging part is formed at another end part of one of said pair of lever parts opposite to the end parts connected by said connection part.

* * * * *

UNITED STATES PATENT AND TRADEMARK OFFICE
CERTIFICATE OF CORRECTION

PATENT NO. : 6,754,039 B2
DATED : June 22, 2004
INVENTOR(S) : Kiyoshi Kumagai

It is certified that error appears in the above-identified patent and that said Letters Patent is hereby corrected as shown below:

Column 3,
Lines 31 and 36, delete "tape $110d$" and insert -- tape $101d$ --.

Column 8,
Lines 50, 54 and 57, delete "lid $110a$" and insert -- lid $101a$ --.

Column 9,
Line 11, delete "lid $110a$" and insert -- lid $101a$ --.

Signed and Sealed this

Fourth Day of April, 2006

JON W. DUDAS
*Director of the United States Patent and Trademark Office*